United States Patent [19]

Hines et al.

[11] Patent Number: 4,606,629
[45] Date of Patent: Aug. 19, 1986

[54] LASER ARCHERY DISTANCE DEVICE

[75] Inventors: Robin H. Hines; Michael R. Glasscock; D. Bruce Johnson, all of Tullahoma; Paul L. Plummer, Nashville, all of Tenn.

[73] Assignee: Quantime, Inc., Tullahoma, Tenn.

[21] Appl. No.: 560,978

[22] Filed: Dec. 13, 1983

[51] Int. Cl.⁴ .................. G01C 3/00; G01C 5/00; F41G 1/00
[52] U.S. Cl. ............................... 356/1; 33/265
[58] Field of Search .................. 356/1, 400; 33/265

[56] References Cited

U.S. PATENT DOCUMENTS

| | | | |
|---|---|---|---|
| 2,788,701 | 4/1957 | Browning | 33/265 |
| 3,671,126 | 6/1972 | Erb | 356/1 |
| 3,682,552 | 8/1972 | Hartman | 356/3 |
| 4,178,693 | 12/1979 | Smith | 33/265 |
| 4,441,810 | 4/1984 | Momose et al. | 356/1 |
| 4,473,959 | 10/1984 | Saltzman | 33/265 |

Primary Examiner—S. C. Buczinski
Attorney, Agent, or Firm—Cushman, Darby & Cushman

[57] ABSTRACT

A method and apparatus for determining distance from a bow to a target at which the bow is aimed in which a beam of collimated light from a laser is directed to the target and reflected to a linear photosensitive element mounted on the bow. The element and laser are positioned on the bow so that the linear position of the incident reflected beam varies with the target distance and the element produces an output indicating the position. A circuit receives that output and produces a display of the target distance.

9 Claims, 8 Drawing Figures

α INDICATES PROPORTIONAL TO

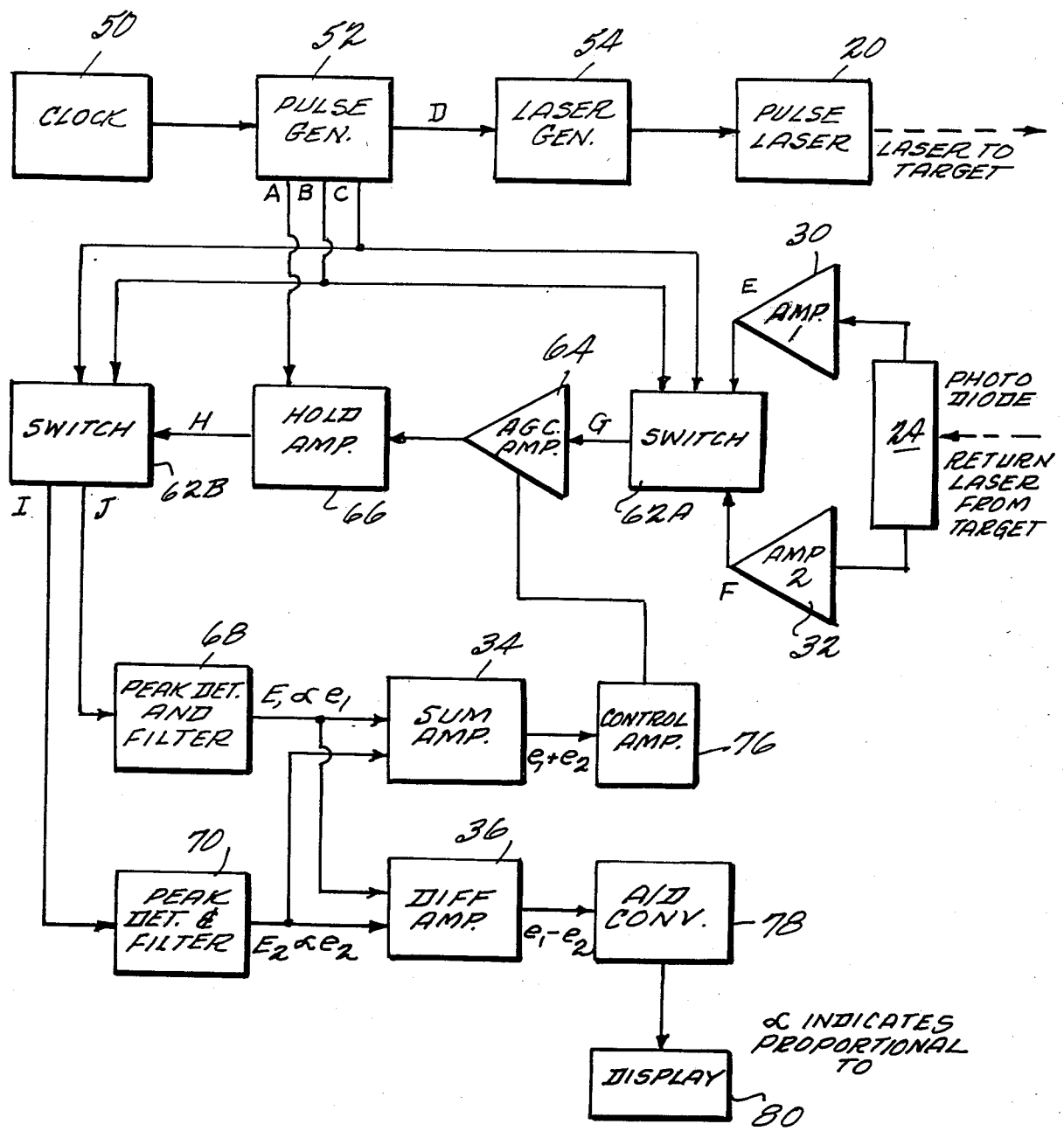
F I G. 6

LASER ARCHERY DISTANCE DEVICE

BACKGROUND AND SUMMARY OF THE INVENTION

The invention relates to a method and apparatus for determining the distance to an archery target.

The use of bow and arrow for game hunting or target shooting is one of the most popular recreational activities throughout the world. Indeed, more than $1 billion is spent each year on purchases of bows alone. In shooting beyond distances of approximately 15 yards, which is almost always required in game hunting, the accuracy of the shot is dependent upon the ability of the archer to adjust the drop of the arrow due to gravity. A skilled archer can accurately hit target distances within approximately 50 yards.

Several techniques have been employed in the past for aiding in effecting the required compensation. The most popular technique employs pins which are spaced apart on the bow. In theory, for a particular type animal such as a deer, the bow angle will be correct when a particular set of two pins are exactly bracketed by the back and belly of the animal. This technique is, however, extremely rough since it presupposes that animals are of the same size and that the pull of each hunter on the string will be the same. Manual optical stereoscopic sights such as used for hunting with guns have also been employed. Such sights are in practice too slow and cumbersome to be of benefit in archery hunting.

The present invention relates to a unique apparatus adapted for mounting on the bow for providing accurate indication to the hunter of the distance to a target. Once the hunter knows the exact distance to the target, he can readily determine from experience or written instructions what angle to the horizontal should be employed for a given pull of the string.

This is achieved by directing a beam of collimated light, preferably coherent radiation from a small solid state laser, to the target so that, when the bow is aimed at a target, light reflected from the target is received by a linear photosensitive element which produces an output indicating the position of the incident radiation in a linear direction. The element and laser are mounted so that the position along the element indicates the distance to the target. Appropriate circuitry is further provided to determine that distance and preferably to digitally display the same to the hunter.

Other objects and purposes of the invention will be clear from the following detailed description of the drawings.

BRIEF DESCRIPTION OF THE DRAWINGS

FIG. 6 shows a schematic view of another circuit for producing a digital display of the distance;

DETAILED DESCRIPTION OF THE DRAWINGS

Figure 1:
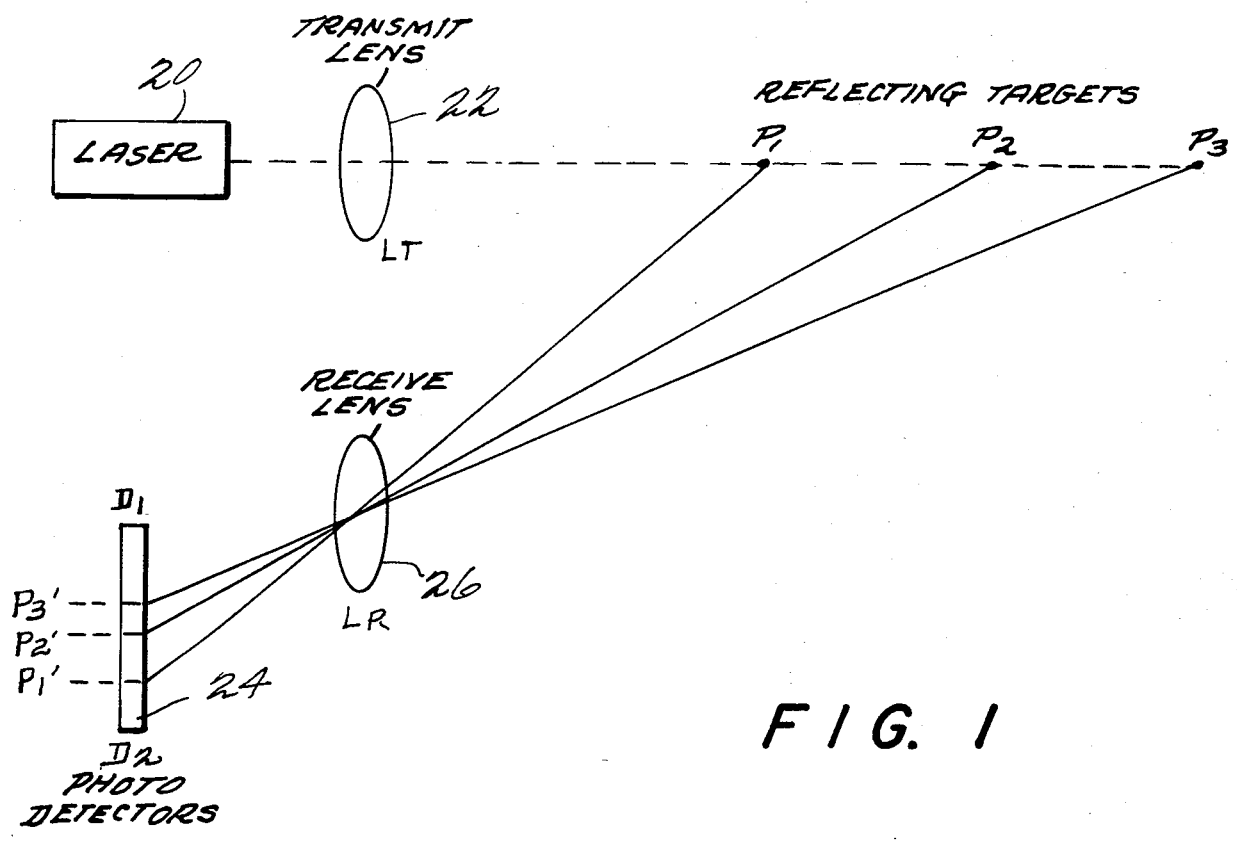
FIG. 1 shows a schematic view of the unique present invention illustrating the theory of operation thereof.

Reference is now made to FIG. 1 which illustrates schematically the operation of the present invention. Collimated light, preferably from a laser 20, is directed by a lens 22 toward a target at which the bow is aimed. Three targets $P_1$, $P_2$ and $P_3$ are shown in FIG. 1 at different distances from laser 20. Light reflected from a target at distance $P_1$ is reflected back to a linear photosensitive element 24 at an angle so that it is incident on photodetector element 24 via lens 26 at a location $P_1'$. A target at $P_2$ is directed to element 24 via lens 26 to impinge at a different location $P_2'$ while reflected radiation at distance $P_3$ is received on photodetector element 24 at location $P_3'$. Therefore, the position of the target can be determined from the position of the incident reflected radiation on the photosensitive element 24.

Figure 2:
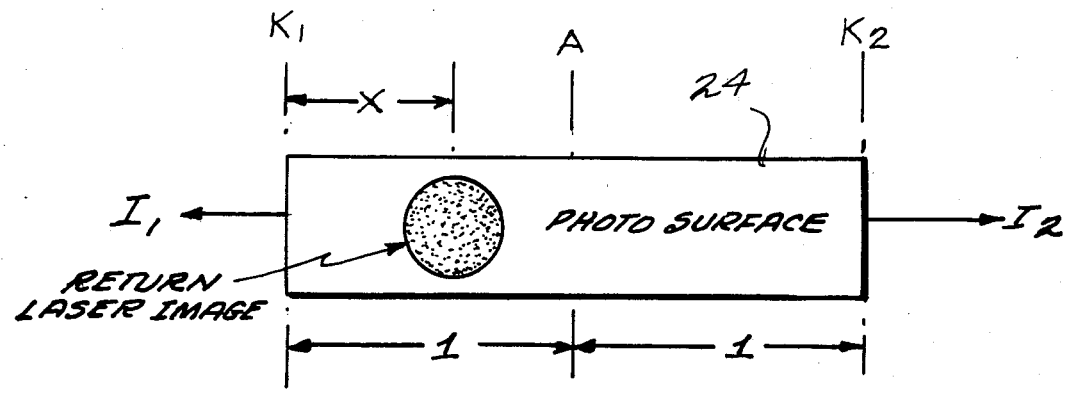
FIG. 2 shows a view of a linear photosensitive element.

Referring to FIG. 2, the linear photosensitive element is illustrated for the purpose of explaining the manner in which the position of the incident radiation on element 24 is determined. Any suitable linear photosensitive element can be employed and several types are available as off-the-shelf items.

In such a photodiode, the current output is both a function of the intensity of the incident radiation and its position. Assuming in FIG. 2 $I_1$ is the current through cathode $K_1$, then such current is proportional to the distance x from the edge of the photodiode and to the intensity S of the received light. Similarly, $I_2$ current through the other cathode $K_2$ is proportional to the distance 2 -x and also to the intensity S of the received light. Thus, $I_1 \, \alpha \, Sx (\alpha$ means proportional to$)$ $I_2 \, \alpha \, S(1 + 1 - x) = 2S - xS$ $I_1 + I_2 = Sx + 2S - xS = 2S$ $I_1 - I_2 = SX - 2S + xS = 2S(x - 1)$ so that $$\frac{I_1 - I_2}{I_1 + I_2} = \frac{2S(x - 1)}{2S} = x - 1 \, \alpha \, x$$

Accordingly, the sum of the two currents is a function of the intensity of the received light and the ratio of the difference of the currents divided by the sum of the currents a function of the position x.

Figure 3:
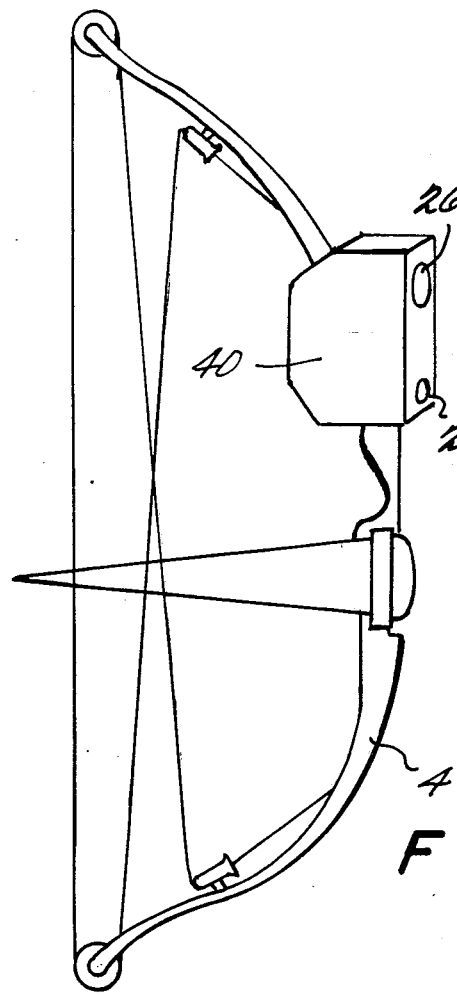
FIG. 3 shows a perspective view of the present invention mounted in place on a compound bow.
Figure 4A:
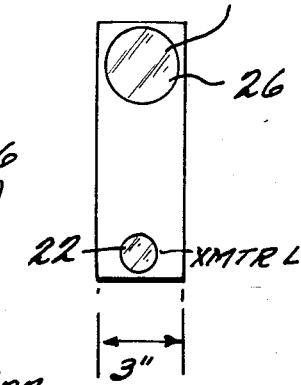
FIGS. 4a and 4b show, respectively, the side and front of the housing of the present invention as mounted in FIG. 3.
Figure 4B:
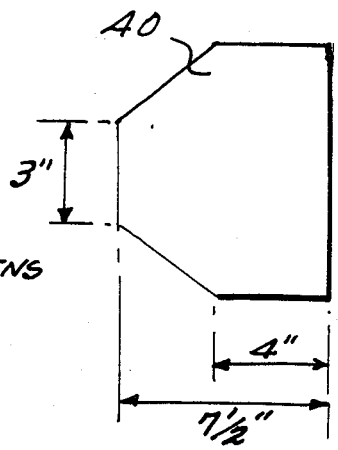

Referring to FIGS. 3 and 4, laser 20, element 26 and the associated circuitry are mounted within a housing 40 which is attached to the bow 42 as shown in FIG. 3. As can be seen in FIG. 4b, the lenses 22 and 26 respectively transmitting and receiving the laser radiation are mounted in linear separation as described above. The housing 40 may be of any suitable material and fastened to the bow in any suitable fashion.

Figure 5:
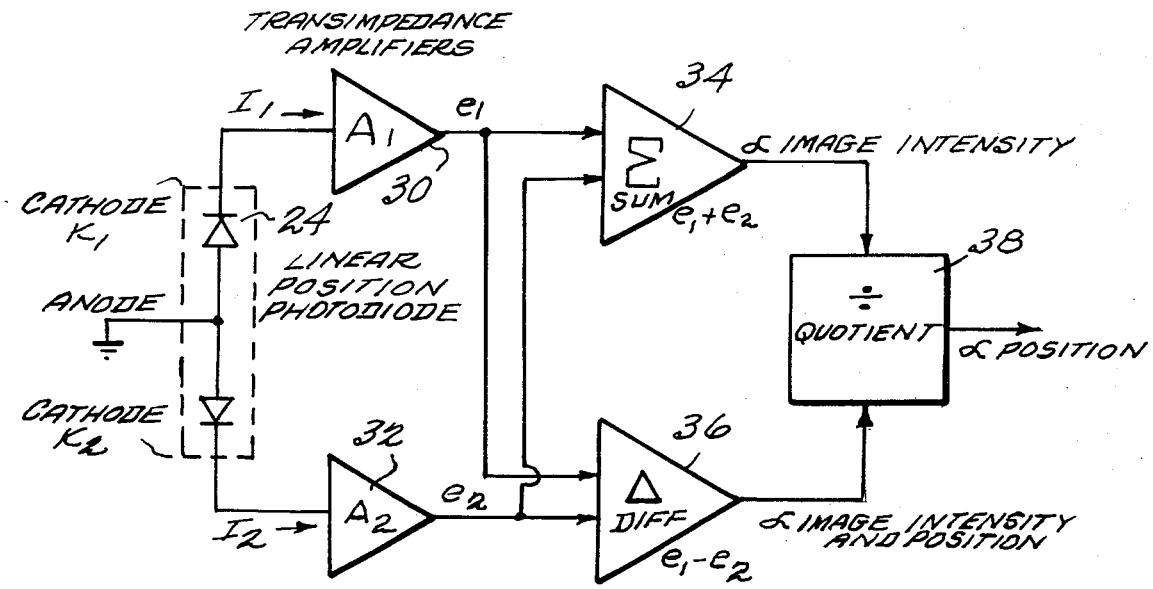
FIG. 5 shows a detailed schematic of a circuit for producing a signal indicating the linear position of the incident beam and hence the target distance.

Referring now to FIG. 5, currents $I_1$ and $I_2$ are respectively amplified in transimpedance amplifiers 30 and 32 with the outputs of each amplifier being applied respectively to conventional summing amplifier 34 and to conventional difference amplifier 36. The respective outputs of amplifiers 34 and 36 are applied to a conventional dividing circuit 38 so that, as indicated, the output reflects the ratio therebetween and, accordingly, the position x.

Reference is now made to FIG. 6 which illustrates a further and preferred embodiment of the present invention. In this circuit, the sum of the amplitudes is used to control a gain control amplifier so that the sum is kept constant and, therefore, the difference directly indicates the position of the incident reflected radiation.

Figure 7:
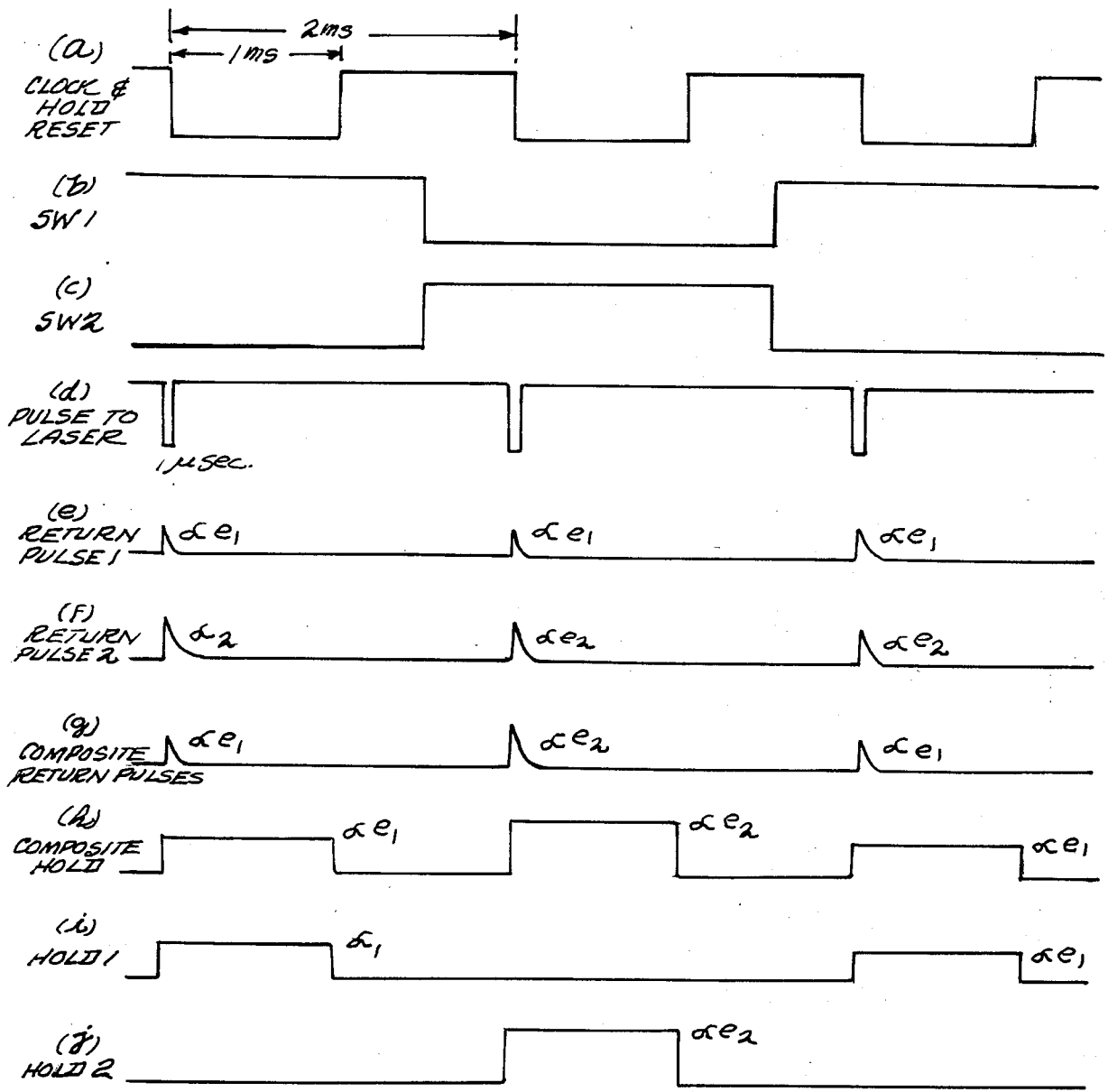
FIG. 7 shows a waveform diagram of the signals produced by the circuit of FIG. 6.

A conventional clock generating a basic timing square wave, as shown in FIG. 7, drives a pulse generator 52 which in turn triggers a conventional laser driver 54 so that the solid state laser 20 produces a sequence of pulses of approximately one microsecond at 500 pulses repetition. These pulses are directed to the target at which the bow is aimed as discussed above.

The returned pulses are received by photodiode element 24 and the two current signals produced at cathodes $K_1$ and $K_2$ respectively applied to amplifiers 30 and 32. Switch circuit 62A alternatively applies the outputs of amplifiers 30 and 32 to an automatic gain control amplifier 64 in accordance with the output of pulse generator 52 and as shown in FIG. 7.

The automatic gain control amplifier 64 is controlled by the sum of the signals from the element 24 so that the signal representing the difference indicates the distance to the target. Circuit 64 also compensates for the wide range of beam intensity received resulting from different target reflectivities and distances.

The output of amplifier 64 is applied to a hold amplifier 66 which as shown in FIG. 7 alternatively provides an output indicating the amplitude of the two currents from element 24. The hold signals are timed to the peak output of the return pulses. The use of a single hold circuit improves the circuit accuracy over one in which separate hold circuits are provided since there is no requirement to match the two hold circuits. The pulses are converted to a composite rectangular wave at the hold amplifier 66 and the signal separated by switch circuit 62B into two rectangular waves proportional to the current signals from element 24. These two signals are then converted to d.c. levels at peak detectors 68 and 70 and the d.c. levels applied respectively to the sum and difference amplifiers 34 and 36. Since the d.c. level has a discontinuity at the sample gate, the d.c. outputs are also filtered by circuits 68 and 70. As noted above, the output of sum amplifier 34 is applied to a control amplifier 76 which in turn controls automatic gain control amplifier 64 so that the output of difference amplifier 36 indicates the distance to the target. The output of amplifier 36 is applied to an analog-to-digital conversion circuit 78 which converts the analog signal to a BCD output. The output of circuit 78 is applied to a conventional digital display 80 mounted on the unit and viewable to the archer to indicate precisely the distance to the target at which he has aimed. Any suitable display in that regard can be utilized.

Many changes and modifications of the above-described embodiment of the invention can, of course, be carried out without departing from the scope thereof. Accordingly, that scope is intended to be limited only by the scope of the appended claims.

What is claimed is:

1. Apparatus for determining distance from a bow to a target comprising:
   means for producing a beam of collimated light;
   linear-shaped photosensitive means for producing an output signal indicating the linear position of an incident beam of reflected light, said linear-shaped photosensitive means comprising a linear photodiode producing first and second current signals the amplitudes of which vary with the position of the incident reflected beam;
   means for mounting said light producing means and said photosensitive means adjacent to each other on a bow so that said beam is reflected from a target to said photosensitive means when the bow is aimed at said target and the linear position of the incident beam on the photosensitive means varies with the distance to said target; and
   circuit means connected to said photosensitive means for receiving said output signal and producing an output indicating the distance to said target, said circuit means including:
   (a) means for producing a train of clock pulses;
   (b) an automatic gain control amplifier;
   (c) switching means controlled by said clock pulses for alternatively applying the first and second current signals to said gain control amplifier;
   (d) a single hold circuit for receiving the output of said gain control amplifier and controlled by said clock pulses to alternately produce an output indicating the respective amplitudes of said first and second current signals;
   (e) a summing circuit for receiving said hold circuit output and controlling said gain control circuit in accordance with the sum of the amplitudes of said first, and second current signals;
   (f) a difference circuit for receiving said hold circuit output and producing a difference output indicating the difference between the amplitudes of said first and second current signals and therefore the position of the incident beam; and
   (g) means for displaying said difference output.

2. Apparatus as in claim 1 wherein said beam producing means is a solid state laser.

3. Apparatus as in claim 1 wherein said display means includes a digital display and an analog-to-digital converter connected to said digital display and to said difference circuit.

4. Apparatus as in claim 1 wherein said circuit means further includes first and second peaking detecting means for each applying an output to said summing circuit and to said difference circuit and second switching means controlled by said clock pulse for alternately applying the output of said hold circuit to said first and second peak detecting means.

5. A circuit for producing an output signal indicating the position of a beam of radiation incident on a linear photodiode producing first and second current signals with the ratio of the difference of the amplitudes of said first and second current signals to the sum of the amplitudes of said first and second current signals varying with the position of incident radiation comprising:
   means for producing a train of clock pulses;
   an automatic gain control amplifier;
   switching means controlled by said clock pulses for alternatively applying the first and second current signals to said gain control amplifier;
   a single hold circuit for receiving the output of said gain control amplifier and controlled by said clock pulses to alternately produce an output indicating the respective amplitudes of said first and second current signals;
   a summing circuit for receiving said hold circuit output and controlling said gain control circuit in accordance with the sum of the amplitudes of said first and second current signals;

a difference circuit for receiving said hold circuit output and producing a difference output indicating the difference between the amplitudes of said first and second current signals and therefore the position of the incident beam; and means for displaying said difference output.

6. A circuit as in claim 5 further including a laser driver circuit controlled by said clock pulses.

7. A circuit as in claim 5 wherein said display means includes a digital display and an analog-to-digital converter connected to said digital display and to said difference circuit.

8. A circuit as in claim 5 further including first and second peaking detecting means for each applying an output to said summing circuit and to said difference circuit and second switching means controlled by said clock pulse for alternately applying the output of said hold circuit to said peak detecting means.

9. In combination:

a laser;

a linear photodiode; and a circuit for producing an output signal indicating the position of a beam of radiation incident on said linear photodiode from said laser after reflection from an object producing first and second current signals with the ratio of the difference of the amplitudes of said first and second current signals to the sum of the amplitudes of said first and second current signals varying with the position of incident radiation including means for producing a train of clock pulses; an automatic gain control amplifier; switching means controlled by said clock pulses for alternatively applying the first and second current signals to said gain control amplifier; a single hold circuit for receiving the output of said gain control amplifier and controlled by said clock pulses to alternately produce an output indicating the respective amplitudes of said first and second current signals; a summing circuit for receiving said hold circuit output and controlling said gain control circuit in accordance with the sum of the amplitudes of said first and second current signals; a difference circuit for receiving said hold circuit output and producing a difference output indicating the difference between the amplitudes of said first and second current signals and therefore the position of the incident beam; means for displaying said difference output, and means for producing pulses for driving said laser in accordance with said clock pulses.

* * * * *